Patented Apr. 20, 1948

2,440,193

UNITED STATES PATENT OFFICE 2,440,193

METHOD OF SEALING AND REINFORCING CARTONS WITH TAPE AND THE TAPE AS AN ARTICLE OF MANUFACTURE

Lewis Davis and Edwin C. Tuukkanen, Worcester, Mass., assignors to McLaurin-Jones Co., Brookfield, Mass., a corporation of Massachusetts No Drawing. Application January 4, 1944, Serial No. 516,974

7 Claims. (Cl. 93—56)

This invention relates to the packaging and labeling of merchandise for shipment, and it is more especially concerned with tapes of the nature used in reinforcing and sealing cartons, paper bags, and other packages and the labels applied to them. For convenience such packages will be hereinafter included, where the context permits, in the term "cartons," and the tapes and labels will be referred to collectively as "tapes."

For most purposes tapes of this character are coated with an adhesive which is readily soluble in water. While they are widely used and, in most instances, are reasonably satisfactory, they are open to the objection that the water-soluble adhesives used in such tapes do become weakened rapidly when exposed to high humidities, as for example, during an ocean shipment or when wet from any cause. Under such circumstances, if the tapes are under strain they are very likely to let go and thus release the goods which the packages are provided to protect.

When it is contemplated that the cartons will be subjected to damp weather for a long time, it is a common practice to seal them with tapes coated with a waterproof adhesive. The manufacture of these tapes, however, is more expensive than that of making the tapes above referred to because the waterproof adhesive must be applied either in a melted condition or dissolved in a non-aqueous solvent. Also, the application of these tapes to the cartons is a more expensive matter for the same reasons, it being necessary to make the adhesive coating tacky either by heat or by the application of a non-aqueous solvent for the adhesive material.

With a view to overcoming these objections and combining the advantages of the two kinds of tapes while eliminating the major disadvantages of both, it has been proposed to coat sealing tapes with a water-soluble protein-type adhesive and later to apply them to the goods by moistening them with a solution of formaldehyde which will react with the adhesive to give it a considerable degree of water-resistance. This expedient, however, has never proved satisfactory, partly because the degree of waterproofness so imparted to the adhesive is inadequate, and partly, also, because the use of formalin or formaldehyde is highly objectionable in a manufacturing plant. It is extremely volatile, highly active chemically, and it attacks supplies of these tapes held in storage, or protein constituents of any kind with which it comes in contact. Moreover, it produces extremely disagreeable working conditions for the employees.

The present invention is especially concerned with the problems presented by these considerations, and it aims to devise a thoroughly practical solution for them. More specifically, it aims to improve the sealing tapes, the cartons used in packaging merchandise of various forms, and also the methods of making and sealing such cartons with a view not only to obtaining the advantages of the water-soluble adhesive types of sealing tapes while still eliminating their objectionable characteristics, but also to producing results fully as satisfactory as those obtained with the use of waterproof sealing tapes and at a lesser expense.

We propose to accomplish this result by producing a tape having an adhesive coating in which both water-soluble and waterproof adhesives will be combined in such a manner that the tape can be applied to the carton by wetting with an aqueous liquid, and including in that liquid a substantially non-volatile constituent that will react chemically with the water-soluble adhesive material to convert it into a form which, in its environment, will be, for practical purposes, waterproof. For example, such a tape may consist of a suitable backing sheet material coated with a mixture of a bone glue, hide glue, fish glue, or other strong adhesive of a protein-type and a waterproof adhesive of a bituminous nature, such as an asphalt.

In the commercial forms of tape embodying this invention, the backing usually consists of a strong paper, such as a Kraft stock. Often, however, such a stock is combined with a fabric reinforcing agent, or the backing consists of some of the plied paper stocks reinforced with fibers, fabrics, or thread, many of which are produced fundamentally for this purpose. Any suitable backing material may be used and its nature will depend chiefly upon the requirements of individual situations.

According to this invention the adhesive to be applied to the backing sheet consists of a mixture of a protein-type glue blended with an asphalt emulsion in proportions which can vary substantially, as will be pointed out later, but which, in a typical instance, will consist of from about 50 to 80 percent (dry weight) of glue and such a percentage of asphalt emulsion as to give a dry weight of asphalt which, with that of the glue, will make a total of 100 percent. Preferably the asphalt base of the emulsion has a melting point of between 135° to 180° F., the lower figure being preferred if the conditions of use permit. A mixture of bone glue and hide glue in proportions of seven parts of the former to one of the latter has given good results, but any good grade of animal glue is satisfactory and other types of protein glues can be used if care is taken to make them sufficiently water-soluble for easy application to the work.

In making up the adhesive composition, the glue is usually dissolved in about one and one-half times its own weight of water, the asphalt is added in the form of one of the commercial emulsions containing, say, 50 percent of dry solids, and the two are mixed together until a homogeneous liquid is produced. This can then be applied to the backing sheet in the usual machinery, the amount of water used in making up the mixture being adjusted to suit the requirements of the coating operation. Usually the backing is in the form of a wide web which is slit into tapes of suitable width after the coating operation has been completed.

Between these operations, of course, the coated web is dried as, for example, by running it over a drying drum or through a drying chamber. This operation takes out most of the water but the temperatures should not be sufficiently high as to break the asphalt emulsion. If the ordinary drying drum is used and the coating material is of a thickness comparable with that common in making gummed tapes, drying temperatures of 160° F. to 175° F. will give satisfactory results. The temperature may be higher if the heating period is brief.

Such tapes can be applied to the cartons or other packages in the usual manner and with the customary machinery employed in applying tapes coated with a water-soluble adhesive, except that instead of wetting the coating with water it is, according to the present invention, wet with a special liquid consisting chiefly of water but containing a substantial proportion of a substantially non-volatile protein converting chemical for waterproofing the glue and preferably including, also, a small quantity of a penetrating agent.

The protein converting chemical may consist of Glyoxal (a dialdehyde) or of any water-soluble chromium salt, or, more preferably, of a mixture of these two constituents.

Glyoxal is readily obtainable on the market in an aqueous solution containing from 30% to 34% of Glyoxal. A formula which has given good results consists of 100 parts of water, 40 parts of said commercial Glyoxal solution, and a quantity of a surface-tension-depressing agent, such as Aerosol, Gardinol, Triton, or some equivalent penetrating agent, equal to about one-tenth of one percent of the combined weight of the water and the Glyoxal.

Of the chromium salts, chromic acetate and, more especially, the chromium salts of the strong inorganic acids, namely, sulphuric, nitric and hydrochloric, are best suited to the purposes of this invention. Of these various salts potassium chromium sulphate, $K_2SO_4 \cdot Cr_2(SO_4)_3 \cdot 24H_2O$; or basic chromium sulphate, $Cr_2(SO_4)_2(OH)_2$ are preferred, but any of the following, with or without water of crystallization, may be used with satisfactory results:

Chromic sulphate;
Chromic chloride;
Chromic nitrate;
Ammonium chromium sulphate, more commonly referred to as chrome ammonium alum; or
Sodium chromium sulphate.

A general formula for a wetting liquid in which chromium salt only is used as the converting chemical is as follows:

Water _____ parts by weight __ 100
Chromium salt _____ do ____ 5 to 20
A wetting agent, such as Aerosol
        per cent by weight __ 0 to 0.1

When chrome alum (potassium chromium sulphate) is used as the converting chemical, a preferred formula consists of 13.2 parts of this constituent dissolved in 100 parts of water with the addition of a wetting agent in substantially the proportions above mentioned.

We prefer, however, to use as a moistening liquid a mixture of aqueous solutions of Glyoxal and one or more chromium salts so as to obtain the somewhat faster reaction properties of the former while avoiding its disadvantages. That is, Glyoxal is an extremely effective converting chemical for the purposes of this invention, but it does have a characteristic odor which, while not nearly as objectionable as that of formaldehyde, is, nevertheless, unpleasant. Also, it stains the skin of the operators' fingers a yellowish color. If, however, the two solutions of Glyoxal and a chromium salt are mixed in about equal proportions, the disagreeable characteristics of the Glyoxal are so far reduced as to be unobjectionable.

The term "converting chemicals" is herein used to designate generically non-volatile chemicals which produce insolubilizing effects like those above described on protein-type glues.

When a tape made in the manner above described is to be applied to a carton or other article of work, its adhesive surface is wet with a liquid of the composition just referred to. It is a surprising fact that the liquid penetrates rapidly through the coating material, notwithstanding the presence of the asphalt or other bituminous waterproofing ingredient. This action apparently is due partly to the presence of the Aerosol or other wetting agent, partly to the fact that the protein-type glue usually is the predominating constituent of this coating and partly, also, to the fact that the waterproofing ingredient is present in the form of an aqueous emulsion. In any event, the coating is softened rapidly by the wetting liquid and the tape adheres firmly to the carton if applied in the usual manner and with the customary degree of pressure. As the aqueous constituent of the liquid dries out, the tape will be found to be bonded securely to the carton.

The reaction between the converting chemical and the protein constituent of the adhesive begins immediately and is substantially completed under normal atmospheric conditions within seventy-two hours. This reaction converts the previously water-soluble protein constituent of the coating into a highly waterproof condition. The exact nature of the chemical substances produced by this reaction is difficult to determine, and it naturally will vary with the chemical characteristics of the particular substances used. The important point is, however, that the glue is converted into a form highly resistant to the action of water.

Our investigation of the reactions which occur indicates that when the adhesive coating on the tape is wet with one of the aqueous solutions of converting chemicals above mentioned, the glue begins to dissolve immediately and the converting chemicals begin to react with it. Strange as it may seem, however, a reaction also occurs between the globules of asphalt emulsion dispersed in the coating (which are still water-soluble) and the converting chemicals, the latter de-emulsifying the asphalt constituent, due to the acid nature of the converting chemicals, and throwing down the particles of asphalt. As this action proceeds and the active ingredients penetrate further into the coating, the final result is that the de-emulsified particles of asphalt coalesce or agglomerate with the converted glue to form a homogeneous film consisting of a mixture of these two water-insoluble constituents. While the action just described has been observed under high power microscopes, and is believed to be an accurate description of the operation which actually occurs, the invention is not limited to this or to any other theory of operation. The action just described is materially facilitated by the fact that the asphalt constituent of the adhesive coating on the tape prior to its application is in the form of globules of emulsified asphalt distributed throughout the glue. This fact helps the reacting chemicals to penetrate readily and relatively uniformly into the adhesive coating, whereas such penetration would be far more difficult if the asphalt were already in an insoluble condition.

In the completed package the backing sheet is secured in place on the carton or other article of work by an intervening layer of material composed of asphalt and the reaction product of the glue and the converting chemical. Actual tests of unions of this type, while under tension and submerged in water, have demonstrated that a bond so produced will retain its strength for days, even under these conditions. Both the asphalt and the reaction product of the glue and the chemical contribute to this result. Exactly how they cooperate is extremely difficult to ascertain, but the fact itself is readily demonstrable. The glue unquestionably furnishes the greater part of the adhesive strength, but the asphalt adds very materially to the security of the bond due, in some measure, we believe, to its adhesive properties, but much more importantly because of its film-forming characteristics and its extraordinary immunity to the action of water.

Considerable tolerance in the proportions of the constituents is permissible, while still producing results satisfactory for most purposes. We have found that the percentage of dry weight of the asphalt can be varied between a minimum of 5% and a maximum of in the neighborood of 70% of the total dry weight of the entire adhesive coating, while still yielding good results. Near the upper extreme of asphalt concentration the adhesive strength is not as great as it is when a higher percentage of glue is used, and for most purposes we prefer to hold the range of asphalt below a maximum of 50% of asphalt solids, the remainder consisting of glue. On the other hand, asphalt is less expensive than glue, and for most purposes it is not necessary to use as high a proportion of glue as is required with only 5% of asphalt. A sealing or reinforcing tape having both ample adhesive strength and sufficient resistance to the action of water is obtainable with proportions of 50% to 60% of glue, the remaining percentage consisting of asphalt.

Also, while an asphalt emulsion is preferred for commercial reasons, nevertheless other emulsified resinous or bituminous materials, such as tars and pitches, can be substituted for it, pine tar pitch, Burgundy pitch and hydrogenated resins, such as Staybelite, being typical examples. What is meant by Staybelite is hydrogenated rosin.

It should be observed that the invention provides not only a method of sealing and reinforcing cartons and the like, which has all of the advantages of those heretofore practiced with the aid of water-soluble adhesive tapes, but that it also produces a result which has only been obtainable heretofore, so far as we are aware, by the use of tapes coated with waterproof adhesives that are either solvent-sensitive or thermoplastic. The present invention, however, presents the advantage over the latter of requiring the use of neither heat nor nonaqueous solvents in making or applying the tapes. Labels may be coated and applied in the same manner and with similar advantages. This method of labeling will be included in the expression "methods of sealing and reinforcing cartons and the like."

This application is a continuation, in part, of our copending applications Serial Nos. 474,228, filed January 30, 1943, and 484,870, filed April 28, 1943, which have been abandoned.

Having thus described our invention, what we desire to claim as new is:

1. That improvement in methods of sealing and reinforcing cartons and the like with a tape having a normally dry, non-tacky coating thereon composed chiefly of a protein-type water-soluble adhesive blended with an emulsified resinous waterproofing agent, comprising the steps of making said coating tacky by wetting it with an aqueous solution containing one or more chemicals adapted to convert the protein constituent of the coating into a water-insoluble form and also to de-emulsify said waterproofing agent, and applying the tape to the desired surface of the carton while said coating is in a tacky condition, whereby said chemical constituent of said wetting liquid will subsequently react with said protein adhesive and with said emulsified waterproofing agent to convert both into water-insoluble forms.

2. A method according to preceding claim 1, in which said solution includes a small proportion of a wetting agent of the surface-tension-depressing type.

3. A method according to preceding claim 1, in which said waterproofing agent is mixed with said protein-type adhesive in proportions of between 5% and 50% of the waterproofing agent to from 95% to 50% of the protein-type adhesive.

4. A method according to preceding claim 1, in which said waterproofing agent consists of an asphalt emulsion and is mixed with said protein-type adhesive in proportions of from 40% to 50% (dry weight) of the asphalt to 60% to 50% (dry weight) of the protein-type adhesive.

5. That improvement in methods of sealing and reinforcing cartons, and the like, comprising the steps of providing a tape carrying a substantially dry, non-tacky coating of a water-soluble protein-type adhesive blended with a substantial proportion of an emulsified, resinous, waterproofing agent, wetting said coating with an aqueous liquid and thereby softening the constituents of said coating and rendering the wetted surface tacky, applying the tacky surface of said tape to the parts of the carton to be sealed or reinforced, and including in said wetting liquid one or more substantially non-volatile chemical substances which will de-emulsify said resinous constituent and will react chemically with said protein-type adhesive to convert it into a water-insoluble compound of a different chemical nature.

6. A readily water wettable sealing and reinforcing tape comprising a thin flexible backing sheet coated on one side thereof with a normally non-tacky mixture by dry weight of 50% to 80% water soluble protein glue and 20% to 50% colloidal particles of waterproof bituminous adhesive dispersed therein, said tape having been formed by coating the sheet with a water solution of the glue containing the bituminous adhesive emulsified therein, and drying the coating to a minimum water content without breaking the emulsion.

7. A readily water wettable sealing and reinforcing tape comprising a thin flexible backing sheet coated on one side thereof with a normally non-tacky mixture by dry weight of 50% to 80% water soluble protein glue and 20% to 50% colloidal particles of waterproof hydrogenated rosin dispersed therein, said tape having been formed by coating the sheet with a water solution of the glue containing the hydrogenated rosin emulsified therein, and drying the coating to a minimum water content without breaking the emulsion.

LEWIS DAVIS.
EDWIN C. TUUKKANEN.

REFERENCES CITED

The following references are of record in the file of this patent:

UNITED STATES PATENTS

| Number | Name | Date |
|---|---|---|
| 729,220 | Renken | May 26, 1903 |
| 909,590 | Harbeck | Jan. 12, 1909 |
| 1,368,236 | Bovy | Feb. 15, 1921 |
| 1,799,797 | Huempfner | Apr. 7, 1931 |
| 1,801,621 | Biddle | Apr. 21, 1931 |
| 1,802,866 | Biddle | Apr. 28, 1931 |
| 1,953,183 | McLaurin | Apr. 3, 1934 |
| 1,969,660 | McLaurin | Aug. 7, 1934 |
| 1,989,875 | McLaurin | Feb. 5, 1935 |
| 2,043,110 | McLaurin | June 2, 1936 |
| 2,071,567 | Pensel | Feb. 23, 1937 |
| 2,311,857 | Noah | Feb. 23, 1943 |
| 2,332,137 | Drew | Oct. 19, 1943 |

FOREIGN PATENTS

| Number | Country | Date |
|---|---|---|
| 2,872 | Great Britain | Mar. 4, 1898 |
| 434,222 | Great Britain | 1935 |